US006305719B1

(12) United States Patent
Smith, Jr. et al.

(10) Patent No.: US 6,305,719 B1
(45) Date of Patent: Oct. 23, 2001

(54) PIPE REPAIR CLAMP

(76) Inventors: Laurence S. Smith, Jr., P.O. Box 816, Humble, TX (US) 77347; Burl William Dowden, 2126 Eaglepoint, Crosby, TX (US) 77532

( * ) Notice: Subject to any disclaimer, the term of this patent is extended or adjusted under 35 U.S.C. 154(b) by 0 days.

(21) Appl. No.: 09/236,877

(22) Filed: Jan. 25, 1999

Related U.S. Application Data

(63) Continuation-in-part of application No. 09/183,430, filed on Oct. 30, 1998, now abandoned.

(51) Int. Cl.$^7$ .................................................. F16L 17/00
(52) U.S. Cl. ..................... 285/15; 285/285.1; 285/294.1; 285/294.3; 285/373; 285/296.1; 138/99
(58) Field of Search ..................................... 285/15, 285.1, 285/293.1, 294.1, 294.3, 296.1, 373; 138/97, 98, 99

(56) References Cited

U.S. PATENT DOCUMENTS

| | | | |
|---|---|---|---|
| 4,049,296 | 9/1977 | Harrison | 285/15 |
| 4,171,142 | * 10/1979 | Harrison | 285/15 |
| 4,274,640 | * 6/1981 | Cook | 285/15 |
| 4,406,481 | 9/1983 | Summerell | 285/15 |
| 4,576,401 | 3/1986 | Harrison | 285/15 |
| 4,709,729 | 12/1987 | Harrison | 138/99 |
| 5,022,685 | * 6/1991 | Stiskin et al. | 285/15 |
| 5,118,139 | 6/1992 | Lott | 285/15 |
| 5,345,972 | * 9/1994 | Goglio et al. | 138/99 |
| 5,375,888 | * 12/1994 | Ikeda | 285/15 |
| 5,605,357 | 2/1997 | Bird | 285/15 |
| 5,918,639 | * 7/1999 | Ottestad et al. | 138/99 |

* cited by examiner

Primary Examiner—Eric K. Nicholson
(74) Attorney, Agent, or Firm—Daniel N. Lundeen; David B. Dickinson; Lundeen & Arismendi, LLP

(57) ABSTRACT

A clamp for repairing a damaged pipe member. Shell members are matingly engaged around the damaged pipe member. Segmented inserts are received in a complementary annular channel formed in an inside face of the shell members to form a ring assembly supporting annular seals between the ring assembly and the damaged pipe member. A shell-sealing annular channel is formed between the ring assembly and the shell members to receive a liquid sealant to form an annular seal between the ring assembly and the shell members. A longitudinal channel is formed in longitudinal faces of the shell member to form longitudinal seals in the shell assembly when a ring assembly is disposed at either end of the shell members. The ring assemblies support seals against the damaged pipe member, including a pipe-sealing annular channel formed between each ring and the damaged pipe member between inner and outer annular seals for receiving a liquid sealant. The pipe-sealing annular channels, the shell-sealing annular channels and the longitudinal channels are in fluid communication to facilitate filling with the liquid sealant.

22 Claims, 7 Drawing Sheets

PIPE REPAIR CLAMP

This is a continuation in part of application Ser. No. 09/183,430, filed Oct. 30, 1998, abandoned.

FIELD OF THE INVENTION

The present invention relates to a clamp for repairing a damaged pipe member, and more particularly to an improved technique for forming a seal between a replaceable insert and a shell or housing for the insert around the damaged pipe member.

BACKGROUND OF THE INVENTION

Leak repair clamps typically bolt or are otherwise fastened around a leaking pipe, flange or valve as a means of repairing the damaged pipe member and stopping fluid leaking therefrom. Such clamps typically have a housing that goes around the damaged pipe member, and a seal at either end thereof. A liquid sealant is usually injected into an annular cavity formed between the housing of the repair clamp, the outside surface of the pipe member, and the seals at either end. The liquid sealant cures to form a seal along the entire length of the annulus.

It is sometimes undesirable to fill the entire annulus with liquid sealant. The sealant is relatively expensive, and can create problems if the leak repair member needs to be removed or replaced. The presence of the liquid sealant in the annulus can also create problems when it is desired to service the pipe member.

In some types of leak repair clamps, the seals at either end are provided as replaceable inserts. See, for example, French Patent 2,426,852; and U.S. Pat. No. 5,118,139 to Lott. These inserts can facilitate manufacturing the inserts and housings or shells in different operations. However, the use of separate inserts and housings requires that a seal be formed between the insert and the housing, in addition to the seal between the inserts and the pipe member. This seal between the inserts and the housing is typically metal-to-metal which requires close machining tolerances, or in some cases the inserts are welded to the housing. The welding, of course, creates another process step in the fabrication or installation of the repair clamp.

SUMMARY OF THE INVENTION

The present invention uses segmented inserts to form a ring assembly inside an outer shell to support a seal against a damaged pipe member. An annular channel is formed between the outer shell and the ring assembly. Liquid sealant can be injected into the annular channel to form a seal between the insert and the shell. A liquid sealant-receiving channel can also be formed between first and second seals of the ring assembly to make a better seal between the ring assembly and the pipe member. Similarly, longitudinal liquid sealant-receiving channels can be formed between opposing longitudinal faces of the shell members that make up the shell between a pair of ring assemblies disposed at either end of the shell to seal the shell between the ring assemblies up to the annular channel between the outer shell and the ring assemblies. In this manner one can avoid the need to fill the entire annular cavity between the shell and the pipe member between the ring assemblies. The liquid-sealant seal between the ring assembly and the outer shell can avoid the need for a metal-to-metal seal, or serve as further seal in addition to a metal-to-metal seal, and eliminate welding the insert segments to the shell members. The manufacture and installation of the leak repair clamp is thus facilitated by the present invention.

Accordingly, in one aspect, the present invention provides a clamp for repairing a damaged pipe member. The clamp has a pair of shell members with opposing longitudinal faces matingly engageable around the damaged pipe member, preferably to form longitudinal seals on opposite sides of the damaged pipe member. Segmented inserts are received in a complementary annular channel formed in an inside face of the shell members to form a ring assembly supporting at least one annular seal between the ring assembly and the damaged pipe member. A shell-sealing annular channel is formed between the ring assembly and the shell members for receiving a liquid sealant to form an annular seal between the ring assembly and the shell members. Means are provided for drawing the shell members together in mating engagement to form a shell assembly around the damaged pipe member. Sealant injection fittings or valves can also be provided for injecting the liquid sealant into the shell assembly.

The shell members preferably have a longitudinal channel formed in the matingly engaged longitudinal faces, between a pair of ring assemblies at either end of the shell members, for receiving liquid sealant to facilitate forming the longitudinal seals. The longitudinal channel is preferably in fluid communication with the shell-sealing annular channels adjacent each of the ring assemblies to form a continuous liquid sealant-filled channel between the shell members, and between the shell assembly and the ring assemblies. The shell members preferably have opposing longitudinal flanges which can be bolted or otherwise drawn together to form the housing around the damaged pipe member. The longitudinal seals are preferably formed in the longitudinal faces of one shell member, while the opposing longitudinal faces of the other shell member are preferably smooth.

Each ring assembly can support a seal against the damaged pipe member which includes longitudinally spaced-apart inner and outer annular seals between each ring assembly and the damaged pipe member. The annular seals can be formed with crush rings, crunch teeth or the like. In this embodiment, the clamp preferably also includes a pipe-sealing annular channel formed between each ring assembly and the damaged pipe member between the inner and outer annular seals for receiving a liquid sealant. Each pipe-sealing annular channel is preferably in fluid communication with a respective shell-sealing annular channel.

Bores can be formed through one or both of the shell members and at least one of the segmented inserts for injecting a liquid sealant into the shell-sealing and pipe-sealing annular channels. These bores can be aligned.

The inserts preferably have a trailing tongue for interengagement with a complementary groove on an inner edge of the channels formed in the inside faces of the shell members.

In one embodiment, a shell assembly with a single ring assembly is used to seal a leaking flanged connection of a damaged pipe member. The ring assembly supports annular seals against each respective flange of the flanged connection. An annulus is preferably formed along an inner face of the ring assembly adjacent to a gap between the annular seals, i.e. between the flanges of the leaking pipe member. The annulus is preferably in fluid communication with the shell-sealing annular channel for receiving a liquid sealant.

In another embodiment, the present invention provides a clamp for repairing a damaged pipe member which is made of two or more pairs of shell members, each having opposing longitudinally flanged faces matingly engagable to form a plurality of longitudinally spaced shell assemblies along the damaged pipe member, including a pair of end shell assemblies at opposite ends. Segmented joining inserts are received in respect of complementary annular channels formed in inside faces of adjacent shell members at opposing ends thereof to form longitudinally formed ring assemblies joining the adjacent pairs of shell members together. Segmented sealing inserts are received in complementary annular channels formed in inside faces of the end shell assemblies to form a pair of end ring assemblies supporting annular seals between each end ring assembly and the damaged pipe member. A shell-sealing annular channel is formed between each segmented insert and its respective annular channel formed in the shell assemblies. A longitudinal channel is formed at the longitudinally flanged faces of the shell members in fluid communication with the shell-sealing channels at either end of each respective shell assembly. The apparatus further includes means for drawing the flanges of the shell members together to form the shell assemblies. The repair clamp can also include a pipe-sealing annular channel formed between each end ring assembly and the damaged pipe member between the inner and outer seals thereof.

In another aspect, the present invention also provides a method for repairing a damaged pipe member. The method includes the steps of assembling the clamp described above around the damaged pipe member, drawing the shell members together in sealing engagement with the damaged pipe member, and injecting liquid sealant into the shell-sealing annular channel, any pipe-sealing annular channels, and any longitudinal channels.

Figure 5:
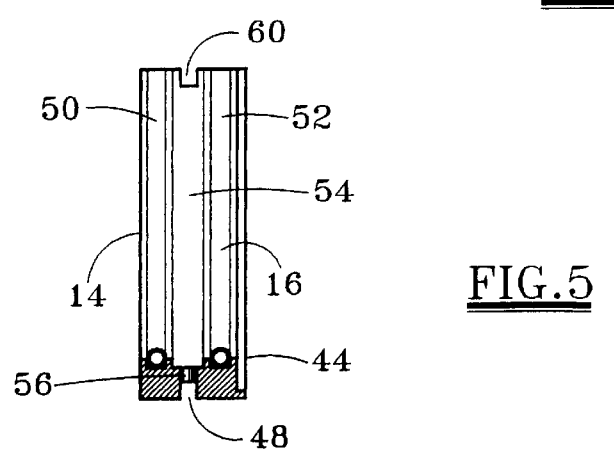
FIG. 5 is a sectional view of the insert of FIG. 4 as seen along the lines 5—5.
Figure 5A:
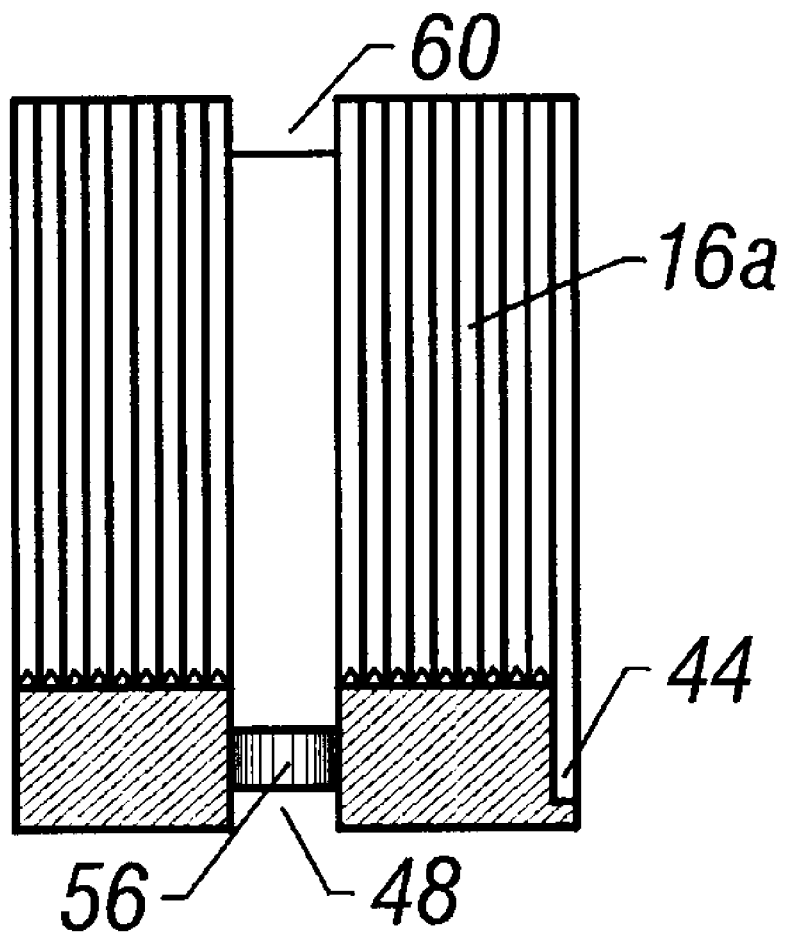
FIG. 5a is a sectional view of the insert with crunch teeth.

At the inside surface of the insert segments 14, a pair of grooves 50,52 are formed to receive crush rings 16. The grooves 50 are formed adjacent an outer end of the shell members 12,18, while the grooves 52 are formed at opposite ends of the insert segments 14 toward the interior of the shell assembly. The crush rings are made, for example, from ⅜ inch stainless steel tubing. Alternatively, the crush rings 16 and either or both of the grooves 50,52 could be replaced with crunch teeth shown in FIG. 5a at 16a) which are also conventional in the leak repair clamping art.

Figure 6:
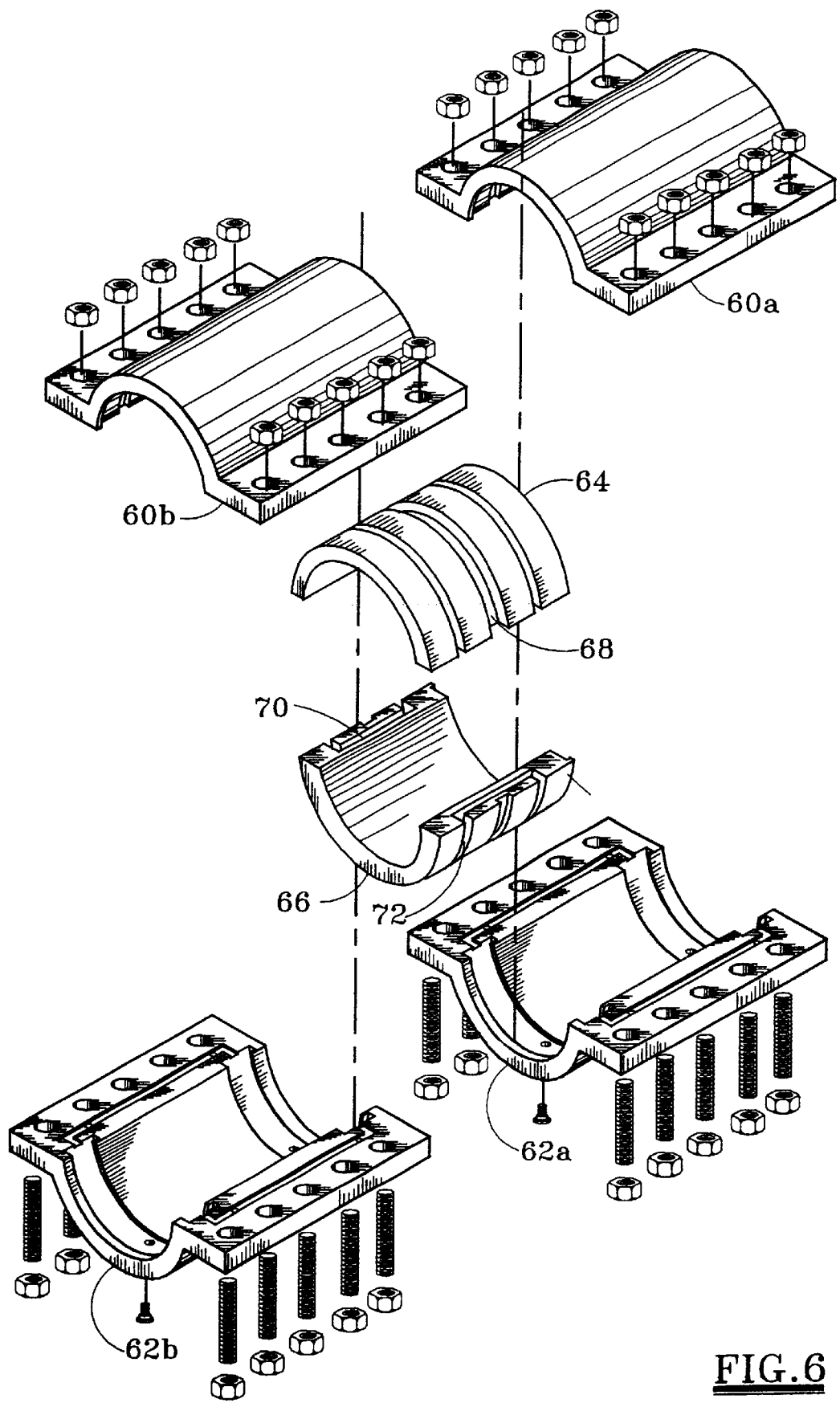

FIG. 6 is an exploded view of an alternate embodiment wherein two shell assemblies are longitudinally joined by an extended ring assembly.

Figure 7:
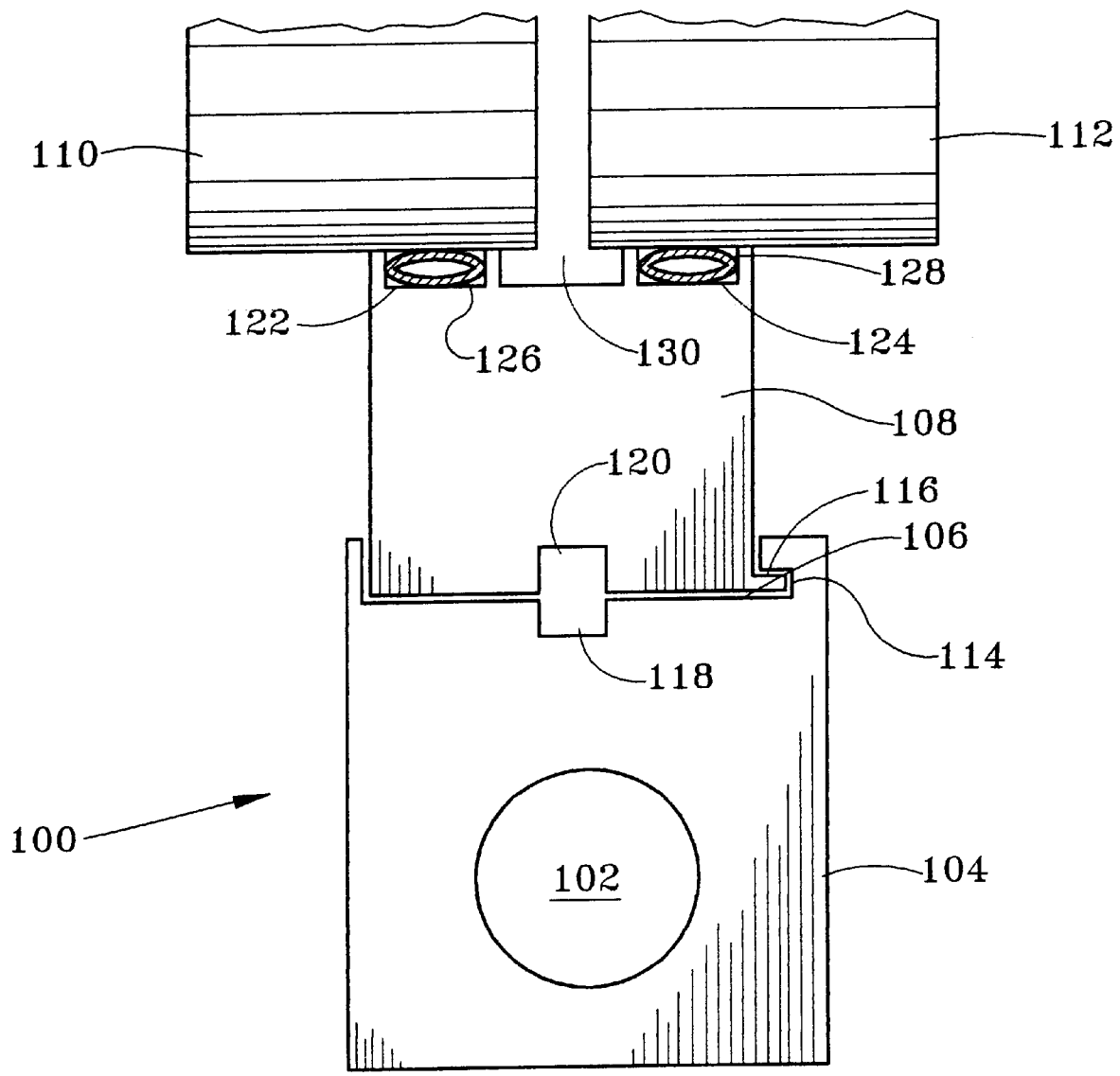

FIG. 7 is a sectional view of an alternate embodiment wherein one ring assembly is secured in a frame with an annular seal on either side of a flanged pipe connection.

Figure 8:
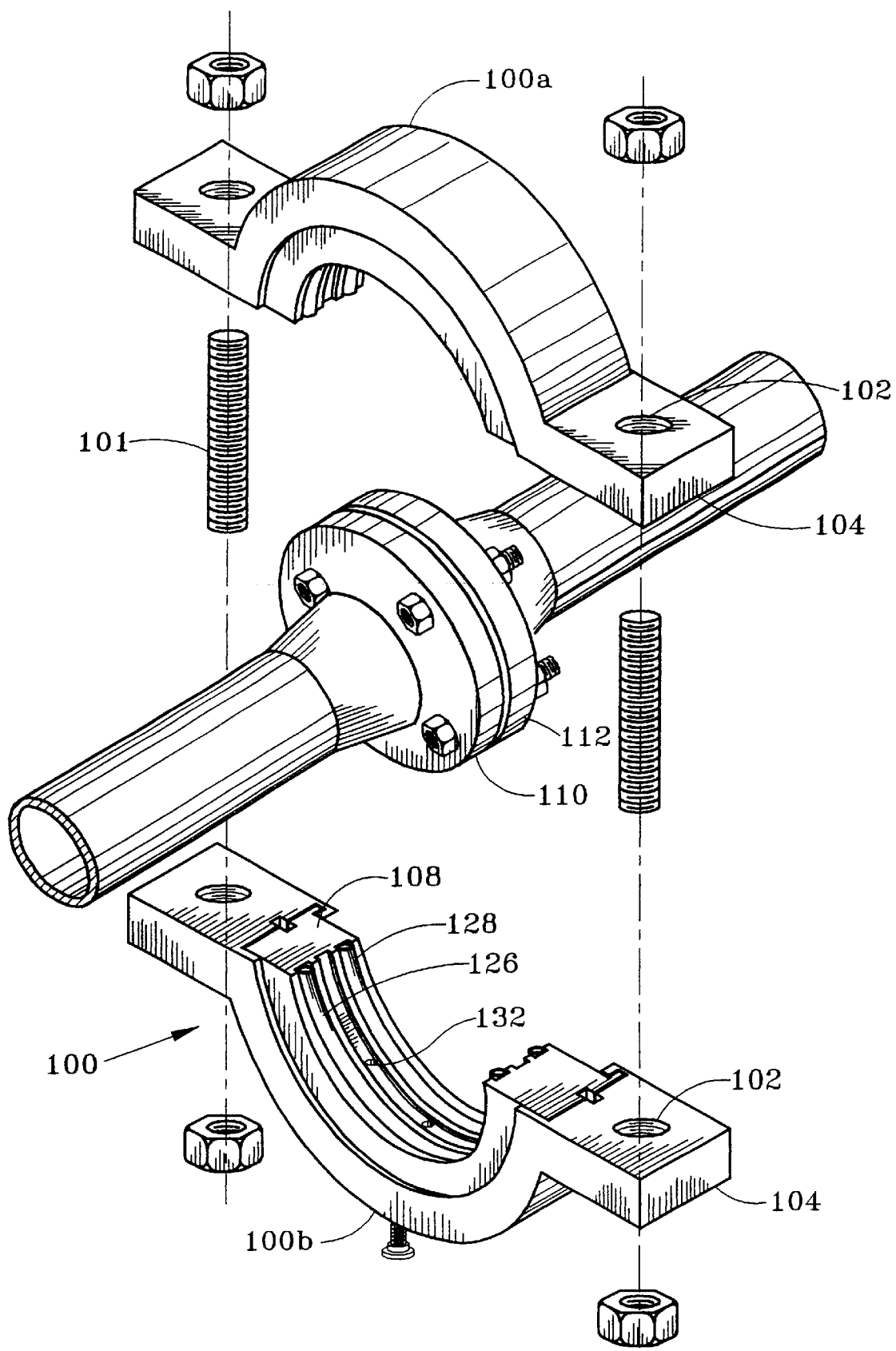

FIG. 8 an exploded view of the leak repair clamp of FIG. 7.

DETAILED DESCRIPTION OF THE INVENTION

Figure 1:
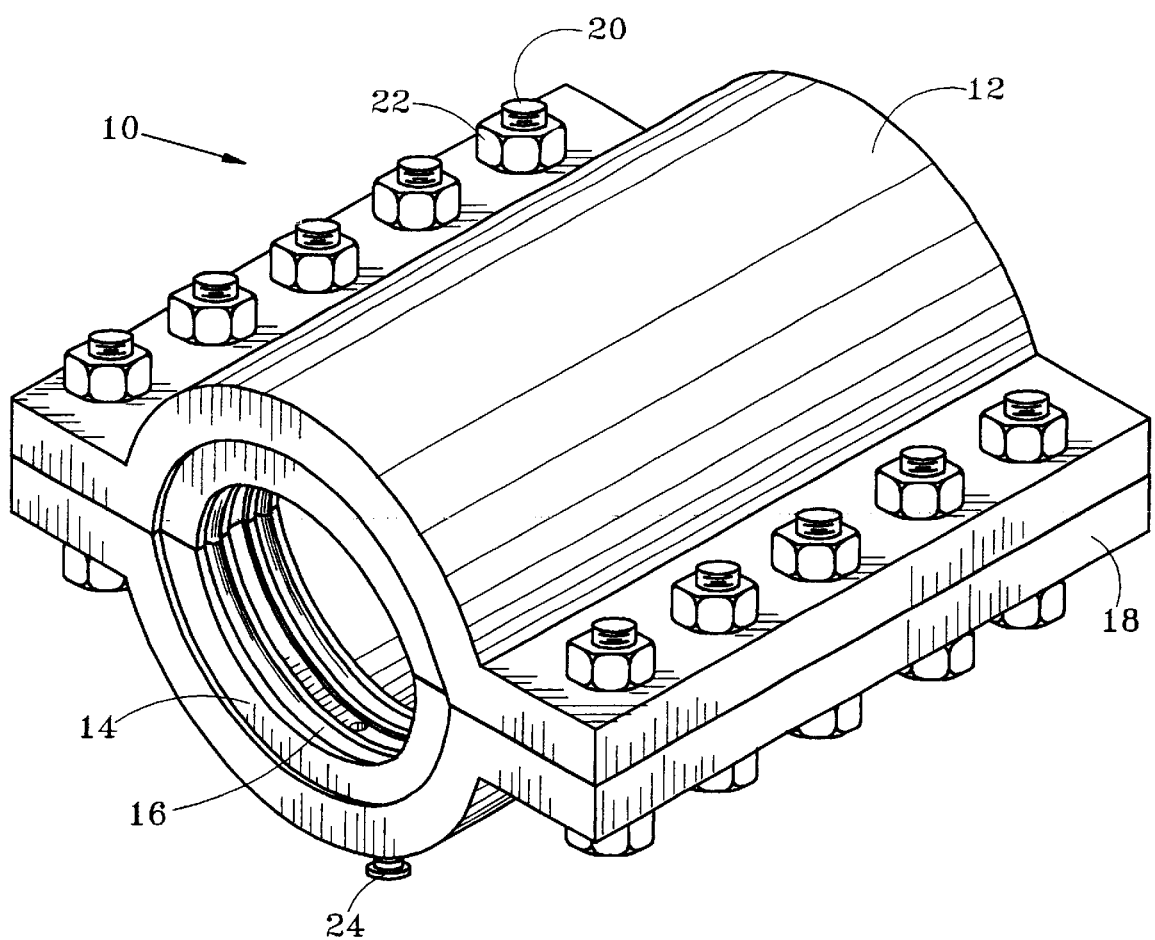
FIG. 1 is a perspective view of an assembled leak repair clamp according to the present invention.
Figure 2:
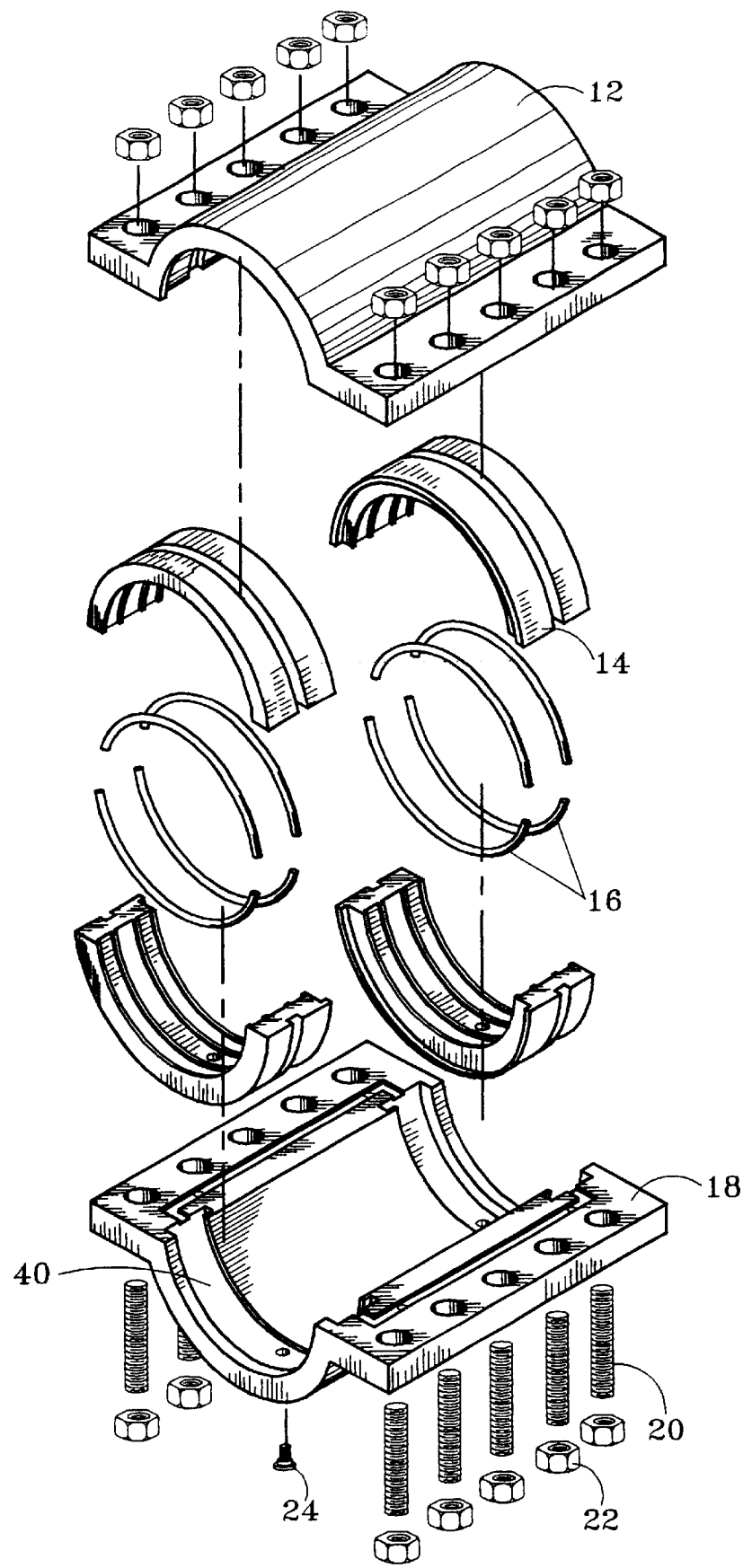
FIG. 2 is an exploded view of the leak repair clamp of FIG. 1.

With reference to FIGS. 1–5 in which like numerals are used to indicate like parts, an assembled leak repair clamp 10 according to one embodiment of the present invention is illustrated in FIG. 1, and an exploded view of the components thereof in FIG. 2. The components shown in FIG. 2 show upper shell member 12, insert segments 14, crush rings 16, lower shell member 18, bolts 20, nuts 22, and sealant injection fittings 24. The components are generally made of steel or other suitable material by casting and/or machining according to techniques conventional in the industry. The shell members 12,18 are preferably stamped from a sheet and machined.

Figure 3:
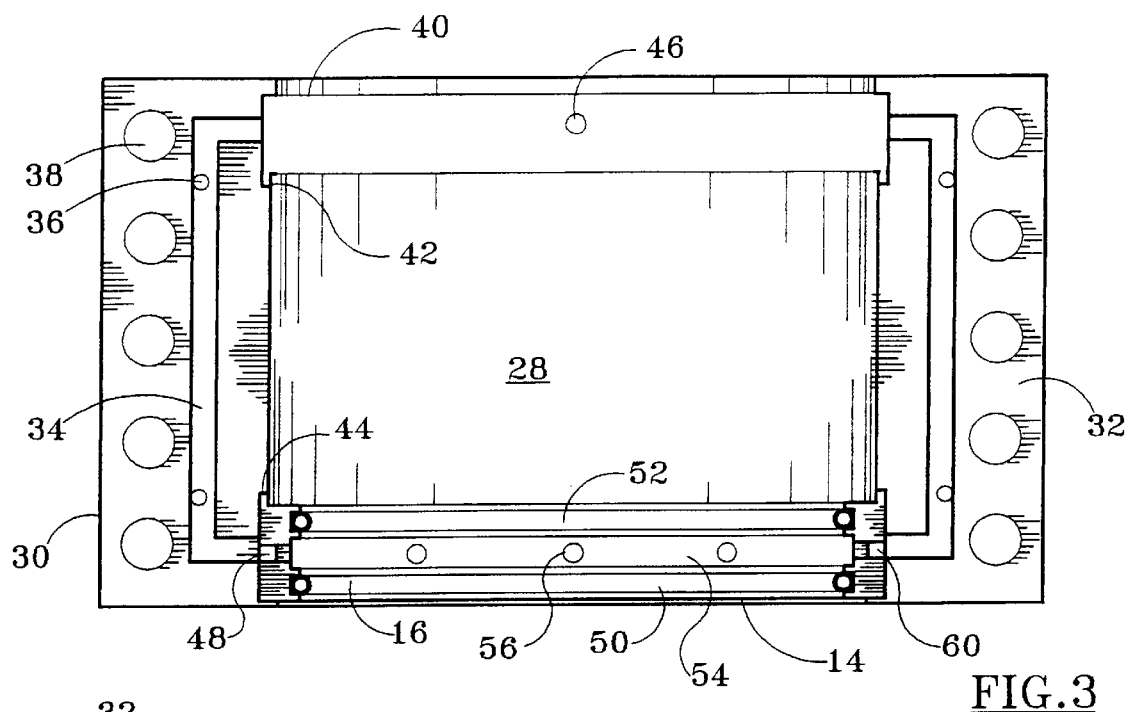
FIG. 3 is a plan view of the leak repair clamp of FIGS. 1–2.
Figure 4:
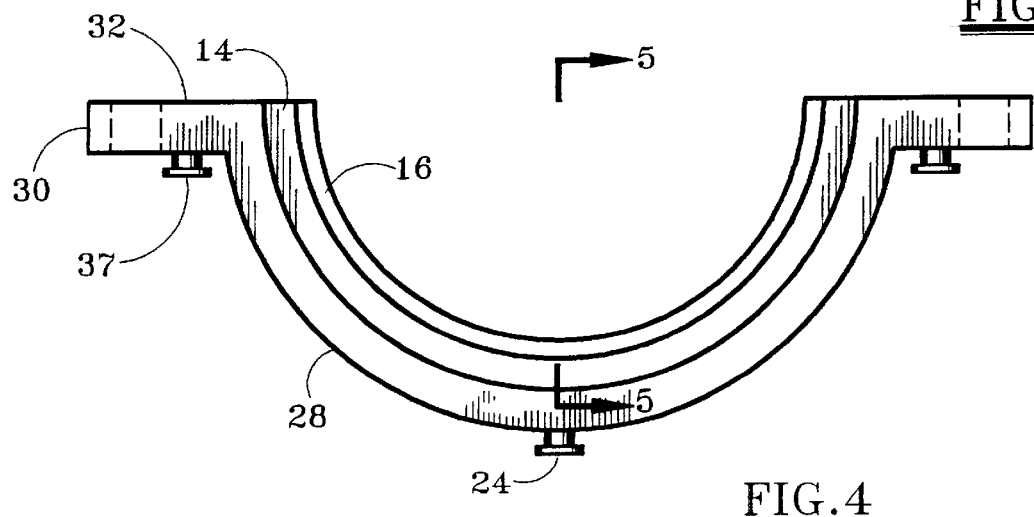
FIG. 4 is an elevation of the leak repair clamp of FIG. 3.

As best seen in FIGS. 3–4, the shell members 12,18 each have a central cylindrical section 28 and ears or flanges 30 on opposite sides thereof. The flanges 30 include a longitudinal face 32 which, when the shell members 12,18 are drawn together, are matingly engaged to form a seal, with or without a gasket (not shown), along the edges of the cylindrical portion 28. A longitudinal channel 34 is preferably formed in at least one of the faces 32, e.g. in lower shell member 18. One of the opposing faces 32 can be smooth, e.g. in upper shell member 12, but it is preferred that at least one of the faces 32 has the channel 34 formed in it to receive a liquid sealant. Ports 36 are provided in the flange 30 for introducing the liquid sealant into the channel 34. The ports 36 are preferably threaded to receive a valve (not shown) or other fitting 37 through which the liquid sealant is introduced. Holes 38 are bored through the flanges 30 to receive the bolts 20 for fastening the shell members 12,18 together by means of nuts 22. Alternatively, any suitable clamping mechanism can be employed to draw and fasten the shell members 12,18 together.

In the cylindrical section 28 of the shell members 12,18, channels 40 are formed at either end to receive each insert segment 14. The channel 40 generally has an inside diameter matching the outside diameter of each of the insert segments 14 and an end profile matching that of the insert segments 14. In a preferred embodiment, a groove 42 is formed on the inside faces of the shell members 12, 18 adjacent the inside wall of each channel 40 to correspond with a tongue 44 formed on a trailing edge at an inside surface of the insert segments 14. In this manner, the insert segments 14 can be held in place in the channels 40 of the shell members 12,18 during shipping and handling prior to installation, as well as after assembly. If desired, the insert segments 14 can be tack welded into place in the channels 40. Ports 46 are likewise formed in the cylindrical sections 28 adjacent to each channel 40 to receive the fittings 24 for liquid sealant injection in the vicinity of the insert segments 14.

Each of the insert segments 14 preferably has an annular shape with an outside diameter and end profiles matching the corresponding dimensions of the channels 40 in each of the shell members 12,18. The outer face of each insert segment 14 preferably includes an outer annular channel 48 circumscribing the outer surface. Alternatively or additionally, an annular sealant-receiving channel (not shown) can be formed in each channel 40. The channel 48 is in fluid communication with the port 46 so that the liquid sealant can be injected through the fitting 24, the port 46 and into the outer annular channel 48.

At the inside surface of the insert segments 14, a pair of grooves 50,52 are formed to receive crush rings 16. The grooves 50 are formed adjacent an outer end of the shell members 12,18, while the grooves 52 are formed at opposite ends of the insert segments 14 toward the interior of the shell assembly. The crush rings are made, for example, from ⅜ inch stainless steel tubing. Alternatively, the crush rings 16 and either or both of the grooves 50,52 could be replaced with crunch teeth (not shown) which are also conventional in the leak repair clamping art.

An inside annulus 54 is formed between the grooves 50,52 in each insert segment 14. The annulus 54 is adapted to receive liquid sealant via a bore 56 from the annular channel 48 which is shell sealing. The inside annulus 54 is also in fluid communication with the outside annular channel 48 by means of recess 60 which can be formed at a radial or transverse end of each of the insert segments 14, preferably at least in the insert segments 14 received in the shell member 18 which has the longitudinal channels 34 formed in the faces 32.

The insert segments 14 and the shell members 12,18 are manufactured separately and later assembled for shipment and/or installation. As mentioned above, the segments 14 can be tack welded into place to hold them in the shell member 12,18. By using the insert segments 14, the leak repair clamp 10 can be built to accommodate different outside diameters of the pipe members using the same size shell members 12,18. For example, the shell members 12,18 can be designed to accommodate insert segments 14 for pipe sizes from two inches to four inches, or the like. The leak repair clamp 10 can also be used to join together pipes of varying sizes, e.g. a two inch pipe on one end joined to a four inch pipe on the other.

In use, the shell members 12,18 with the insert segments 14 and crush rings 16 positioned in place are assembled around a damaged pipe member to be repaired, and drawn together by means of the bolts 20 and nuts 22. As the flanges 30 are drawn together the crush rings 16 are deformed to form a metal-to-metal seal against the outer surface of the damaged pipe member being repaired. Also, the crush rings 16 deform to overlap at their abutting ends to form continuous seals around the pipe member.

After the leak repair clamp is assembled in position around the pipe member, conventional liquid sealant is introduced through the fittings 24 and/or 37 to fill the various channels. The liquid sealant then cures in place to form seals. A seal is formed in the outer annular channels 48 to seal between the insert segments 14 and the shell members 12,18. The sealant also forms a seal between the outer surface of the damaged pipe member and the insert segments 14, between the metal-to-metal seals formed by the end pair of crush rings 16. This ensures that the seal against the damaged pipe member is fluid tight and capable of withstanding pressures which might be generated by fluid leaking from the damaged pipe member into the annular cavity between shell members 12,18 and the insert segments 14. In addition, a seal is formed by the cured liquid sealant in the longitudinal channels 34 which can be introduced through the fittings 37 and/or from the inner annular channel 54 and outer annular channel 48 via the recess 60 via fluid communication between the longitudinal channel 34 and the outer annular channel 48.

In another embodiment illustrated in FIG. 6, a pair of shell assemblies 60a,62a and 60b,62b are joined together longitudinally by an extended ring assembly made up of segments 64,66. This arrangement can be used when a relatively longer leak repair clamp is required, for example, when the pipe member to be repaired has damage which extends beyond the length of the repair clamp illustrated in FIGS. 1–5. By use of additional extended ring assemblies, any number of the leak repair clamps can be joined together to repair a pipe member of indefinite length. The extended ring assemblies comprise a pair of symmetrical ring end segments 64,66 which generally have the same profile as the insert segments 14 described above in connection with FIGS. 1–5, except that each extended ring assembly segment 64,66 includes an elongated annular section 68 joining the two end ring structures together. A seal is formed between each pair of extended ring assembly segments 66 by forming a longitudinal channel 70 between opposing longitudinal surfaces in fluid communication at either end thereof with an annular channel 72 to receive liquid sealant.

A further embodiment for repairing a leaking flanged pipe connection is shown in FIGS. 7 and 8. The frame 100 comprises a pair of shell members 100a,100b secured together by bolts 101 passing through holes 102 formed in opposing ears 104. An annular channel 106 receives a plurality of insert segments 108 which form a ring around flange members 110,112. The channel 106 generally has an inside diameter matching the outside diameter of each of the insert segments 108 and an end profile matching that of the insert segments 108, preferably a groove 114 on one end of the channel 106 to receive a tongue 116 formed on one end of the insert segments 108. An inner annular recess 118 is formed in a central area of the channel 106 for receiving a liquid sealant.

The insert segments 108 form a ring having an annular shape with an outside diameter and end profile matching the corresponding dimensions of the annular channel 106 in the frame 100. The outer face of each insert segment preferably includes an outer annular recess 120 aligned with the annular recess 118 of the frame 100 for receiving liquid sealant therein.

At the inside surface of the insert segments 108, a pair of grooves 122,124 are formed to receive crush rings 126,128 or crunch teeth (not shown) adjacent either longitudinal end of the insert segments 108. An annulus 130 is formed in the inside surface of the insert segments 108 disposed between the grooves 122,124 so as to straddle the opposing end surfaces of the flanges 110, 112. One or more radial bores (not shown) are formed through the frame 100 to introduce liquid sealant into the grooves 118,120. A plurality of radial bores 132 are formed through the insert segments 108 to pass liquid sealant between the annulus 130 and the annulus 130 to fill any gap between the flanges 110,112.

In use, the flanged pipe repair clamp of FIGS. 7–8 functions similarly to the embodiments shown in FIGS. 1–6. Each of the insert segments 108 is placed in a corresponding frame member 100a,100b with the tongues 116 received in the grooves 114 to keep the segments 108 from falling out of the channel 106. The frame members 100a,100b and insert segments 108 are then positioned to encircle the leaking flange connection to be repaired, with each of the crush rings 126,128 positioned to abut respective flanges 110,112 and groove 120 positioned to overlay the gap between the flanges 110,112, using bolts 132 in the bolt holes 134 to hold the assembly together in place. If desired, the insert segments 108 can be rotated in the channel 106 so as to offset the break between the insert segments 108 from that of the frame members 100a,100b. The bolts 101 are then tightened to secure the leak repair clamp in place and deform the crush rings 126,128 to form a metal-to-metal seal around the perimeter of the flanges 110,112. Then, liquid sealant is injected as previously described to fill the annulus 130 (including the gap between the flanges 110,112), and the annular recesses 118 and 120, and allowed to cure in place to form a further seal.

While the invention has been described above with reference to specific embodiments, the disclosure is illustrative only and is not intended to be limiting, but only to serve as an exemplary guide to the invention. Various modifications and alterations to the specific embodiments described above will become apparent to those skilled in the art in view of the foregoing disclosure. It is intended that all such variations and modifications within the scope and spirit of the appended claims be embraced thereby.

What is claimed is:

1. A clamp for repairing a damaged pipe member, comprising:
   a pair of shell members having opposing longitudinal faces matingly engageable around the damaged pipe member;
   segmented inserts received in a complementary annular channel formed in an inside face of the shell members to form a ring assembly supporting at least one one annular seal between the ring assembly and the damaged pipe member;
   a shell-sealing annular channel comprising a continuous annular recess formed between the ring assembly and the shell members for receiving a liquid sealant to form an annular seal between the ring assembly and the shell members;
   means for drawing the shell members together in mating engagement to form a shell assembly around the damaged pipe member; and
   means for injecting the liquid sealant into the shell assembly.

2. The clamp of claim 1 comprising a longitudinal channel formed in the matingly engaged longitudinal faces for receiving liquid sealant to facilitate forming longitudinal seals between the shell members on opposite sides of the damaged pipe member between a said shell-sealing annular channel disposed at each longitudinal end of the shell members.

3. The clamp of claim 2 wherein the longitudinal channel is in fluid communication with the shell-sealing annular channels for forming a continuous liquid sealant-filled channel between the shell members and between the shell assembly and the ring assemblies.

4. The clamp of claim 3 wherein each ring assembly supports seals against the damaged pipe member including longitudinally spaced-apart inner and outer annular seals, and further comprising:
   a pipe-sealing annular channel formed between each ring assembly and the damaged pipe member between the inner and outer annular seals thereof for receiving a liquid sealant.

5. The clamp of claim 4 wherein the pipe-sealing annular channels are in fluid communication with a respective shell-sealing annular channel.

6. The clamp of claim 1 comprising opposing longitudinal flanges on the shell members.

7. The clamp of claim 1 wherein the ring assembly supports annular seals adjacent to each respective flange member of a leaking pipe member comprising a flanged connection.

8. The clamp of claim 7 further comprising an annulus along an inner face of the ring assembly between the annular seals.

9. The clamp of claim 8 wherein the annulus is in fluid communication with the shell-sealing annular channel.

10. A clamp for repairing a damaged pipe member, comprising:
    a pair of shell members having opposing longitudinally flanged faces matingly engageable to form a shell assembly around the damaged pipe member;
    segmented inserts received in a complementary annular channel formed in an inside face of the shell members at opposite ends thereof to form ring assemblies supporting longitudinally spaced-apart inner and outer annular seals between each ring assembly and the damaged pipe member;
    a shell-sealing annular channel formed between each ring assembly and the shell members;
    a longitudinal channel formed at the longitudinal faces in fluid communication with the shell-sealing channels at each end thereof;
    a pipe-sealing annular channel formed between each ring assembly and the damaged pipe member between the inner and outer seals; and
    means for drawing the flanges of the shell members together to form the shell assembly.

11. The clamp of claim 10 comprising transverse bores formed through one of the shell members and at least one of the segmented inserts for injecting a liquid sealant into the shell-sealing and pipe-sealing annular channels.

12. The clamp of claim 11 wherein the bores though the shell and insert are radially aligned.

13. The clamp of claim 10 wherein the annular seals comprise crush rings.

14. The clamp of claim 10 wherein the annular seals comprise crunch teeth.

15. The clamp of claim 10 wherein the longitudinal seals are formed in the longitudinal faces of one shell member and the opposing longitudinal faces of the other shell member are smooth.

16. The clamp of claim 10 wherein the flanges are bolted together.

17. The clamp of claim 10 wherein the inserts have a trailing tongue for interengagement with a complementary groove on an inner edge of the channels formed in the inside faces of the shell members.

18. A clamp for repairing a damaged pipe member, comprising:
    at least two pairs of shell members having opposing longitudinally flanged faces matingly engageable to form a plurality of longitudinally spaced shell assemblies including a pair of end shell assemblies around the damaged pipe member;
    segmented joining inserts received in respective complementary annular channels formed in inside faces of adjacent shell members at opposing ends thereof to form longitudinally joined ring assemblies joining the adjacent pairs of shell members together;
    segmented sealing inserts received in complementary annular channels formed in inside faces of the end shell assemblies to form a pair of end ring assemblies supporting at least one annular seal between each end ring assembly and the damaged pipe member;
    a shell-sealing annular channel formed between each segmented insert and its respective annular channel formed in the shell assemblies;
    a longitudinal channel formed at the longitudinally flanged faces in fluid communication with the shell-sealing channels at either end of each respective shell assembly; and
    means for drawing the flanges of the shell members together to form the shell assemblies.

19. The clamp of claim 18 wherein each end ring assembly supports inner and outer spaced-apart annular seals between each end ring assembly and the damaged pipe member, and further comprising:
    a pipe-sealing annular channel formed between each end ring assembly and the damaged pipe member between the inner and outer seals thereof.

20. A method for repairing a damaged pipe member, comprising the steps of:
    (a) assembling the clamp of claim 1 around the damaged pipe member;
    (b) drawing the shell members together in sealing engagement with the damaged pipe member; and (c) injecting liquid sealant into the shell-sealing annular channel.

21. A method for repairing a damaged pipe member, comprising the steps of:
    (a) assembling the clamp of claim 10 around the damaged pipe member;
    (b) drawing the shell members together in sealing engagement with the damaged pipe member; and,
    (c) injecting liquid sealant into the shell-sealing annular channel.

22. A method for repairing a damaged pipe member, comprising the steps of:
    (a) assembling the clamp of claim 18 around the damaged pipe member;
    (b) drawing the shell members together in sealing engagement with the damaged pipe member; and,
    (c) injecting liquid sealant into the shell-sealing annular channel.

* * * * *